United States Patent
Lee (10) Patent No.: US 9,335,574 B2
(45) Date of Patent: May 10, 2016

(54) METHOD FOR MANUFACTURING LIQUID CRYSTAL DISPLAY PANEL AND LAMINATE FOR THE SAME

(71) Applicant: Samsung Display Co., Ltd., Yongin, Gyeonggi-Do (KR)

(72) Inventor: Kwang Ho Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 29 days.

(21) Appl. No.: 14/248,451

(22) Filed: Apr. 9, 2014

(65) Prior Publication Data

US 2015/0036094 A1 Feb. 5, 2015

(30) Foreign Application Priority Data

Aug. 5, 2013 (KR) .................. 10-2013-0092671

(51) Int. Cl.
*G02F 1/1333* (2006.01)
(52) U.S. Cl.
CPC .. *G02F 1/1333* (2013.01); *G02F 2001/133302* (2013.01); *G02F 2001/133325* (2013.01)
(58) Field of Classification Search
CPC .................. G02F 1/1333; G02F 2001/133302; G02F 2001/133325
USPC ........................................................ 349/158
See application file for complete search history.

(56) References Cited

U.S. PATENT DOCUMENTS

| | | | |
|---|---|---|---|
| 7,406,994 B2 * | 8/2008 | Martinez et al. | 156/762 |
| 8,398,873 B2 | 3/2013 | Yoshikawa et al. | |
| 2011/0092006 A1 | 4/2011 | An et al. | |
| 2012/0009703 A1 | 1/2012 | Feinstein et al. | |
| 2012/0202030 A1 | 8/2012 | Kondo et al. | |
| 2013/0316609 A1 * | 11/2013 | Kwon .................. | G02F 1/1333 445/24 |

FOREIGN PATENT DOCUMENTS

| | | |
|---|---|---|
| JP | 2006-243184 A | 9/2006 |
| JP | 2009-186916 A | 8/2009 |
| JP | 5029523 B2 | 7/2012 |
| KR | 1020100070730 A | 6/2010 |
| KR | 10-1160158 B1 | 6/2012 |
| KR | 10-1161264 B1 | 6/2012 |
| KR | 1020120099018 A | 9/2012 |
| KR | 1020120130966 A | 12/2012 |
| KR | 1020130003997 A | 1/2013 |
| KR | 1020130024385 A | 3/2013 |
| WO | 2010079688 A1 | 7/2010 |

* cited by examiner

*Primary Examiner* — Charles Chang
(74) *Attorney, Agent, or Firm* — Cantor Colburn LLP (57) ABSTRACT

A method of manufacturing a liquid crystal display panel includes preparing thin substrates for upper panel and lower panels, and first and second support substrates for the thin substrates, attaching the thin substrate for the upper panel to the first support substrate, and attaching the thin substrate for the lower panel to the second support substrate, forming the upper and lower panels by forming members for the display panel on surfaces of the respective thin substrates in a state where the thin substrates are attached to the first and second support substrates, respectively, bonding the upper and lower panels, and separating the first and second support substrates from the upper and lower panels, where at least one part of a border of a surface of each of the first and second support substrates, where the surface is attached to the upper or lower panel, is tapered.

20 Claims, 5 Drawing Sheets

FIG. 9 ions No. 10-2013-0092671 filed on Aug. 5, 2013, and all the benefits accruing therefrom under 35 U.S.C. §119, the entire contents of which are incorporated herein by reference.

METHOD FOR MANUFACTURING LIQUID CRYSTAL DISPLAY PANEL AND LAMINATE FOR THE SAME

This application claims priority to Korean Patent Application No. 10-2013-0092671 filed on Aug. 5, 2013, and all the benefits accruing therefrom under 35 U.S.C. §119, the entire contents of which are incorporated herein by reference.

BACKGROUND (a) Field

The invention relates to a method of manufacturing a liquid crystal display panel, and a laminate for the same.

(b) Description of the Related Art

A liquid crystal display ("LCD"), which is one of the most widely used flat panel display devices, is a device for changing an alignment of liquid crystal molecules by forming an electric field by applying different potentials to a pixel electrode and a common electrode of an LCD panel, and adjusting a light transmission rate through the change of the alignment of the liquid crystal molecules to display an image.

The LCD panel is a part corresponding to a display unit of the liquid crystal display, and in general, a liquid crystal material is filled between an upper panel, on which a common electrode, a color filter, and the like are provided, and a lower panel on which a thin film transistor ("TFT"), a pixel electrode, and the like are provided, and the upper panel and the lower panel are bonded to each other.

The upper panel and the lower panel of the LCD panel are provided by forming the aforementioned members for the display panel, such as the electrode and the color filter, on a glass substrate generally having a thickness of approximately 0.5 millimeter (mm) to approximately 0.7 mm. Accordingly, a thickness of the LCD panel in a state where the upper panel and the lower panel are bonded to each other exceeds approximately 1 mm.

Particularly, in a mobile device, such as a tablet personal computer ("PC"), a notebook computer and a smart phone, it is very important to make an entire device be thin in terms of commercial and technical aspect, so that it is necessary to make the LCD panel be thin. To this end, a technology of manufacturing the LCD having the aforementioned thickness, and then etching surfaces of the upper and lower panels, that is, the glass substrates, with a chemical material, such as hydrofluoric acid, to make the LCD panel be thin, for example, approximately 0.2 mm to approximately 0.4 mm has been used.

SUMMARY

An etching of the glass substrate requires additional costs, and in this case, chemical material used in the etching causes an environmental problem. Accordingly, instead of a method of making the liquid crystal display ("LCD") panel be thin by manufacturing and etching the LCD panel, a method of manufacturing the LCD panel by using a thin substrate from the beginning has been suggested. However, an existing process line of manufacturing the LCD panel is optimized to a substrate having a thickness of approximately 0.5 millimeter (mm) to approximately 0.7 mm, so that in a case where a thin substrate is used, the substrate may be broken during a process of manufacturing the LCD panel.

The invention has been made in an effort to provide a method of manufacturing an LCD panel by using thin substrates and support substrates.

Further, the invention has been made in an effort to provide a method of manufacturing an LCD panel, in which thin substrates and support substrates are easily separated, and a risk of damaging the substrates is low, and a laminate for the same.

An exemplary embodiment of the invention provides a method of manufacturing an LCD panel, including preparing thin substrates for an upper panel and a lower panel, and first and second support substrates for the thin substrates, attaching the thin substrate for the upper panel to the first support substrate, and attaching the thin substrate for the lower panel to the second support substrate, forming the upper panel and the lower panel by forming members for the display panel on surfaces of the respective thin substrates in a state where the thin substrates are attached to the support substrates, respectively, bonding the upper panel and the lower panel, and separating the first and second support substrates from the upper panel and the lower panel, in which at least one part of a border of a surface of each of the first and second support substrates, where the surface is attached to the upper or lower panel, is tapered.

At least one corner among corners of the border of each of the first and second support substrates may be tapered.

The tapered portions of the borders of the first and second support substrates may be inclined at a predetermined inclination with reference to a direction in which the upper and lower panels are extended.

The tapered portions of the borders of the first and second support substrates may be inclined while forming curved surfaces with reference to a direction in which the upper and lower panels are extended.

At least one portion of a border of a bonded surface of each of the upper and lower panels may be tapered, and the tapered portions of the first and second support substrates may be extended to the tapered portions of the upper and lower panels.

The method may further include surface-treating at least one surface among the surfaces of the thin substrates and the support substrates to be attached, before the attaching the support substrates to the thin substrates.

The surface-treating may include performing a hydrophobic treatment on the surfaces of the substrates.

The method may further include forming a liquid crystal layer before or after the bonding of the upper panel and the lower panel.

The separating of the support substrates may include pushing a cutting unit between external surfaces of the panels and the tapered portions of the support substrates and peeling off the support substrates.

The method may further include separating the support substrates with a vacuum or adsorption jig after the peeling off of the support substrates by the cutting unit.

Another exemplary embodiment of the invention provides a laminate, including an upper panel and a lower panel in which members for a display panel are disposed on surfaces of thin substrates, a first support substrate attached to an upper surface of the upper panel, and a second support substrate attached to a lower surface of the lower panel, in which at least one part of a border of a surface of each of the first and second support substrates, where the surface is attached to the upper or lower panel, is tapered.

At least one corner among corners of the border of each of the first and second support substrates may be tapered.

The tapered portions of the borders of the first and second support substrates may be inclined at a predetermined inclination with reference to a direction in which the upper and lower panels are extended.

The tapered portions of the borders of the first and second support substrates may be inclined while forming curved surfaces with reference to a direction in which the upper and lower panels are extended.

At least one portion of a border of a bonded surface of each of the upper and lower panels may be tapered, and the tapered portions of the first and second support substrates may continue with the tapered portions of the upper and lower panels.

At least one corner of the thin substrate may be rounded, and the rounded corner may have a curvature radius of 3 mm or lower.

The first and second support substrates may have the same size as or a larger size than the thin substrate.

A thickness of the thin substrate may be approximately 2 mm or lower.

A thickness of each of the first and second support substrates may be approximately 4 mm or more, and a width of the tapered portion of the border may be approximately 2 mm or lower.

A thickness of an end of the tapered portion of the border may be approximately 0.1 mm to approximately 0.3 mm.

According to the invention, it is possible to manufacture an LCD panel without damaging thin substrates. Particularly, it is possible to easily separate support substrates from panels, and minimize a generation of a scratch on the support substrates, thereby increasing a possibility and the number of times of reuse of the support substrates

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A method of manufacturing a liquid crystal display ("LCD") panel according to an exemplary embodiment of the invention, and a laminate will be described in detail with reference to the accompanying drawings.

Figure 1:
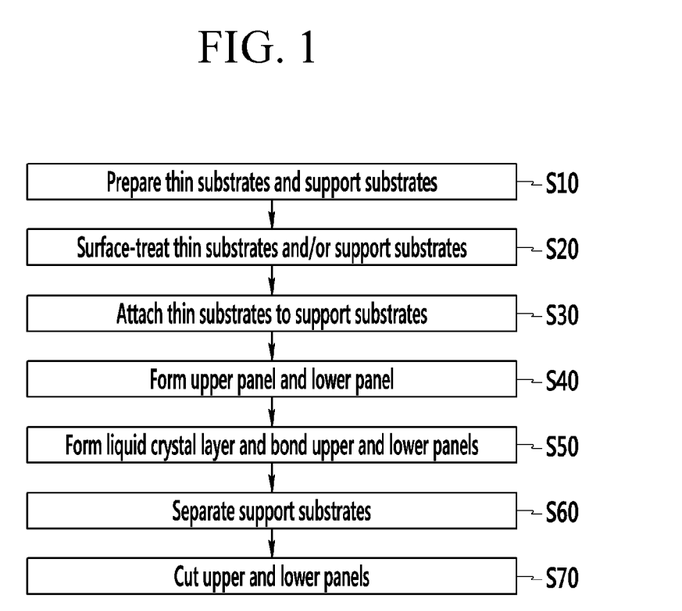
FIG. 1 is a flowchart illustrating an exemplary embodiment of a manufacturing process of a liquid crystal display ("LCD") panel according to the invention.

FIG. 1 is a flowchart illustrating a manufacturing process of the LCD panel according to the exemplary embodiment of the invention.

As illustrated in FIG. 1, first, thin substrates and support substrates are prepared (S10). The thin substrate includes a transparent insulating substrate for forming an upper panel and a lower panel to be described below, and may include a glass substrate. The support substrate is a substrate for support each thin substrate so as to effectively prevent the thin substrate from being damaged during the process of manufacturing the LCD panel, and may include a glass substrate. In an exemplary embodiment, two thin substrates and two support substrates may be prepared to manufacture one LCD panel.

In an exemplary embodiment, the thin substrate may have a thickness of, for example, approximately 2 millimeters (mm) or less, preferably, approximately 1 mm. In the exemplary embodiment, the support substrate may have a thickness of, for example, approximately 4 mm or more, preferably, approximately 5 mm. The thin and support substrates are cut in a form of a rectangle having predetermined sizes, respectively, and are subjected to a washing process.

The support substrate may be processed so that at least one part of a border, preferably, at least one corner of four corners of the border, is tapered after the cutting and before the washing. The thin substrate may be processed so that at least one corner is rounded after the cutting and before the washing.

Next, the thin substrates and support substrates are surface-treated (S20), and the thin substrates and the support substrates are attached to each other (S30). Accordingly, two sets of attached substrates, in which the thin substrates are attached on the support substrates, are prepared, and the respective attached substrates are used for forming the upper panel and the lower panel.

The surface-treatment of the thin substrate and the support substrate may include performing a hydrophobic treatment on a surface to which the thin substrate and the support substrate are to be attached. The surface-treatment is generally performed on only one of the thin substrate and the support substrate, but may be performed on both substrates. In an exemplary embodiment, the hydrophobic treatment may be performed in a wet method. In an exemplary embodiment, the hydrophobic treatment may be performed so that a contact angle is, for example, equal to or greater than approximately 30 degrees (°), preferably, approximately 40° to approximately 70°.

The main purpose of the hydrophobic treatment is to enable the support substrates to be easily separated from the upper and lower panels when separating the support substrates after bonding the upper panel and the lower panel during the process of the manufacturing the LCD panel.

After the surface-treatment, the thin substrates and the support substrates are attached to each other with the surface-treated surfaces as attachment surfaces. The attachment may be performed without adding an attachment material between the thin substrate and the support substrate. As described above, the thin and/or support substrates are subjected to the washing process, and micro moisture may be left on the surfaces of the substrates after the washing, and the thin substrates and the support substrates may be attached to each other by hydrogen bond by the moisture. In addition, van der Waals Force or static electricity may be involved in the attachment.

In an exemplary embodiment, the attachment of the thin substrates and the support substrates may be performed by a roll-to-sheet lamination process.

Next, the upper panel and the lower panel are formed (S40). The upper panel and the lower panel are formed by forming members for the display panel, such as an electrode, a thin film transistor ("TFT"), a color filter, a light blocking member and a passivation layer, for example, on a thin substrate side surface of each of the attached substrate. Since the thin substrates are subjected to the process while being supported by the support substrates, the upper panel and the lower panel may be formed, for example, without damaging the thin substrates in an existing process line which is optimized to a substrate having a thickness of approximately 0.5 mm to approximately 0.7 mm, for example.

The lower panel may be a TFT panel (which is also referred to as a TFT substrate or an array substrate) on which, for example, the TFT, and the like are formed, and the upper panel may be a color filter panel (which is also referred to as a CF substrate or an opposing substrate) on which the color filter and the like are formed. The upper panel and the lower panel are formed in a state of being supported by the support substrates, and a high temperature process is performed when forming the upper panel and the lower panel, so that attachment force is increased between the thin substrates and the support substrates configuring the upper and lower panels due to fusion bond by a high temperature.

Next, a liquid crystal layer is formed and the upper and lower panels are bonded (S50). In the forming of the liquid crystal layer and the attachment of the upper and lower panels, the former may be performed before or after the latter. That is, liquid crystal may be dropped on any one panel by a method, such as an inkjet printing, and then the other panel may be bonded to the panel on which the liquid crystal is dropped, or the two panels are bonded to each other and then liquid crystal may be injected through an injection hole between the two panels. During the step, a process, such as dispersion of a spacer or application of a sealant, may be performed. The substrates, in which the upper and lower panels are bonded with the support substrates attached thereto, are also referred to as a "laminate" in the invention.

The bonding of the upper and lower panels is performed in a state where the support substrates are attached, so that the support substrates need to be separated after the bonding (S60). The separation of the support substrates may be performed by initially peeling off the support substrates and the thin substrates by inserting a blade of a cutting unit (e.g., knife) between the attachment surfaces of the support substrates and the thin substrates, and then peeling off the support substrates, or the bonded two panels depending on a case, with a vacuum/adsorption jig.

When the support substrates are separated, only the bonded upper and lower panels including the thin substrates are left.

This state is substantially the same as an existing state in which the upper and lower panels are formed and bonded to each other by using relatively thick substrates and then are subjected to chemical etching. In the exemplary embodiment of the invention, the upper and lower panels are manufactured by using the thin substrates having a thickness of approximately 1 mm, so that even though the upper and lower panels are bonded, a final thickness is approximately 2 mm. Accordingly, an etching process for making the LCD panel be thin is not required.

The upper and lower panels, which are bonded to each other, but from which the support substrates are separated, are cut to have a predetermined size (S70), so that the LCD panel is completed. A polarizer may be attached before or after cutting the bonded panels.

Figure 2:
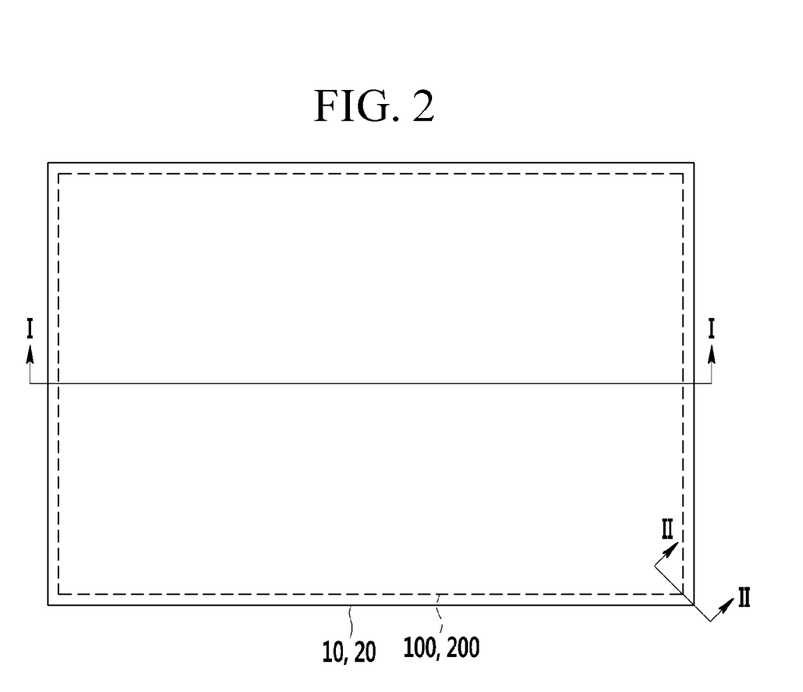
FIG. 2 is a diagram illustrating the exemplary embodiment of a state of a laminate before upper and lower panels are bonded and then support substrates are separated in manufacturing the LCD panel according to the invention.
Figure 3:
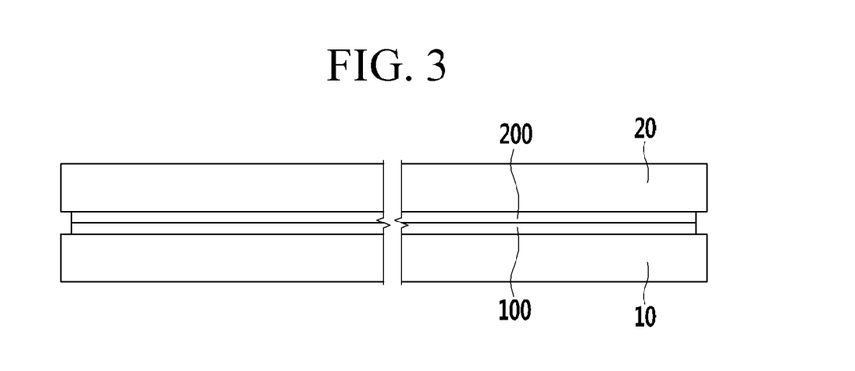
FIG. 3 is a cross-sectional view taken along line I-I of FIG. 2.
Figure 4:
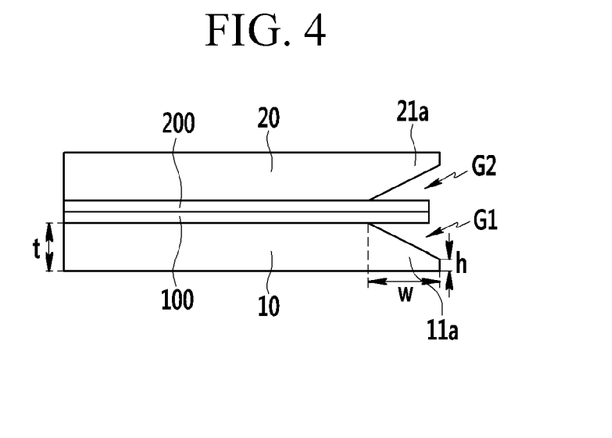
FIG. 4 is a cross-sectional view taken along line II-II of FIG. 2.

FIG. 2 is a diagram illustrating a state of a laminate before the upper and lower panels are bonded and then the support substrates are separated in manufacturing the LCD panel according to the exemplary embodiment of the invention, FIG. 3 is a cross-sectional view taken along line I-I of FIG. 2, and FIG. 4 is a cross-sectional view taken along line II-II of FIG. 2.

Referring to FIGS. 2 to 4, the laminate includes lower and upper panels 100 and 200 including lower and upper thin plates, respectively, between lower and upper support substrates 10 and 20. In FIG. 2, the lower and upper panels 100 and 200 are hidden by the lower and upper support substrates 10 and 20, so that the lower and upper panels 100 and 200 are indicated with dotted lines. Although not illustrated, a liquid crystal layer may be disposed between the lower panel 100 and the upper panel 200.

The lower and upper support substrates 10 and 20 are attached to the lower and upper panels 100 and 200, and may be in a state in which an attachment force is increased compared to that at the initial attachment after passing through a high temperature process for forming the panels.

A common electrode including a transparent conductor, such as an indium-tin-oxide ("ITO") is disposed on one surface of the upper panel 200 (i.e., a surface of the upper panel 200 facing the lower panel 100) disposed on the upper support substrate 20. A color filter may be disposed on the upper panel 200, and in this case, the upper panel 200 may be also referred to as a color filter panel or a color filter substrate.

The lower panel 100 disposed on the lower support substrate 10 includes a TFT, a pixel electrode, and the like, disposed on the surface facing the upper panel 200. A source terminal of the TFT is connected with a data line, a gate terminal thereof is connected with a gate line, and a drain terminal thereof is connected with a pixel electrode, and the aforementioned constituent elements, other than the pixel electrode, including metal, which is a light reflective material. In general, the lower panel 100 is also called a TFT panel or a TFT substrate. In the meantime, a color filter, in addition to the TFT, may also be disposed on the lower panel 100. In this case, the color filter may not be disposed on the upper panel 200.

The lower panel 100 and the upper panel 200 are bonded to each other, and a liquid crystal material is filled in a space therebetween by drop or injection. When the TFT is turned on by applying an electrical signal to the gate line and the source line of the TFT of the lower panel 100, an electric field is disposed between the pixel electrode of the lower panel 100 and the common electrode of the upper panel 200. An arrangement of liquid crystal molecules disposed between the lower panel 100 and the upper panel 200 is changed by the electric field, and a light transmission rate is changed to display a desired image according to the changed arrangement.

Referring to FIGS. 2 and 3, it is illustrated that the lower and upper panels 100 and 200 are slightly smaller than the lower and upper support substrates 10 and 20. The reason is that it may be difficult to attach the thin substrates and the support substrates so that both ends of the thin substrates and the support substrates correspond to each other when attaching the thin substrates to the support substrates.

In a case where the thin substrate and the support substrate have the same size, when the thin substrate and the support substrate are not attached so that both ends of the thin substrate and the support substrate accurately correspond to each other, a part of the edge of the thin substrate may not be supported by the support substrate. The part of the thin substrate, which is not supported by the support substrate, is exposed to an outside of the support substrate during the manufacturing process of the panels, to be easily damaged. Accordingly, the lower and upper panels 100 and 200 may have a size smaller by approximately 0.5 mm to approximately 3.5 mm, for example, in a horizontal direction and a vertical direction, respectively, than the lower and upper support substrates 10 and 20.

However, the lower and upper panels 100 and 200 need not be essentially smaller than the lower and upper support substrates 10 and 20, and may be the same as each other in another exemplary embodiment. When photoresist is coated on entire surfaces of the thin substrates, on which the lower and upper panels 100 and 200 are to be formed, by a slit coater, for example, during the process of forming the panels, the photoresist is also coated on the support substrates 10 and 20. Then, even though the photoresist is removed after a development process, the photoresist may be easily left at boundaries of the edges of the thin substrates and the support substrates 10 and 20. The left photoresist may act as an adhesive between the thin substrates and the lower and upper support substrates 10 and 20 to be an obstacle to separate the lower and upper support substrates 10 and 20 from the lower and upper panels 100 and 200. Accordingly, when it is possible to attach the thin substrates and the support substrates so that both ends thereof correspond to each other, the thin substrates and the support substrates may have the same size.

FIG. 4 illustrates a cut surface of one corner portion of the laminate. Contrary to FIG. 3 illustrating a cut surface of the laminate in a horizontal direction, corners 11a and 21a of the surfaces attached to the lower and upper panels 100 and 200 are tapered. Here, the tapered corners may mean that only the corners of the lower and upper support substrates 10 and 20 facing the lower and upper panels 100 and 200 are obliquely provided, corners thereof facing the opposite sides of the lower and upper panels 100 and 200 are maintained in a flat state, and are gradually thin as being close to the corners of the support substrates 10 and 20.

The tapered corners 11a and 21a may be provided by performing a chamfer processing, such as grinding, on a corner of one surface of the lower and upper support substrates 10 and 20. In an exemplary embodiment, the processing may be performed before attaching the thin substrates before the forming of the lower and upper panels 100 and 200 to the lower and upper support substrates 10 and 20.

Cross-sections of the tapered corners 11a and 21a may have, for example, a trapezoid shape as illustrated in FIG. 4. In a case where a thickness t of each of the lower and upper support substrates 10 and 20 is approximately 5 mm, a width w of the tapered corner may be approximately 2 mm or lower. When the width w is excessively long, a crack may be easily generated at a corresponding corner of the lower and upper support substrates 10 and 20 during the process of manufacturing the LCD substrate, and when the crack is generated, it may be difficult to re-use the support substrate or the crack may progress to an inside of the corner.

Edges of the tapered corners are the thinnest portions in the lower and upper support substrates 10 and 20, and a thickness h thereof may be, for example, approximately 0.1 mm to approximately 0.3 mm, preferably, approximately 0.2 mm. When the edges of the tapered corners are excessively thin, the lower and upper support substrates 10 and 20 may be easily damaged even though a slight impact is applied thereto, and when the edges of the tapered corners are excessively thick, it is difficult to secure a space to which a cutting unit is inserted for separating the lower and upper support substrates 10 and 20.

Figure 5:
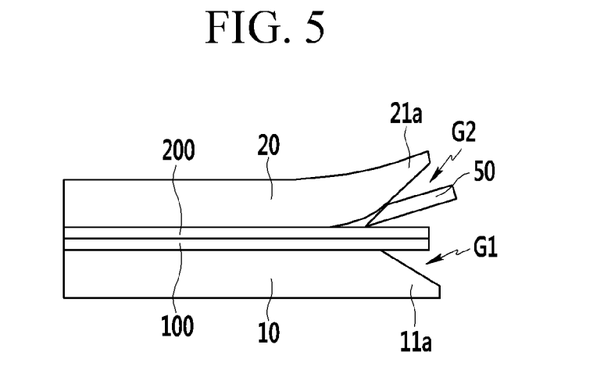
FIG. 5 illustrates an exemplary embodiment of in which the support substrate is initially separated with a cutting unit the invention.

A gap G1 is defined at the corner side between the lower panel 100 and the lower support substrate 10, and a gap G2 is defined at the corner side between the upper panel 200 and the upper support substrate 20, by the tapered corners 11a and 21a. FIG. 5 illustrates an exemplary embodiment in which a cutting unit 50 is inserted to the gaps G1 and G2 to initially peel off the lower and upper support substrates 10 and 20.

The separation of the lower and upper support substrates 10 and 20 may be first performed on the upper support substrate 20, and then performed on the lower support substrate 10, or may be performed on the lower support substrate 10 and then performed on the upper support substrate 20 on the contrary. Depending on a case, the separation of the lower and upper support substrates 10 and 20 may be simultaneously performed on the lower support substrate 10 and the upper support substrate 20. FIG. 5 illustrates an exemplary embodiment in which the upper support substrate 20 is first separated.

When the cutting unit 50 is inserted to the gap 20 between the tapered corner 21a and the upper panel 200, the blade of the cutting unit 50 may accurately and easily reach the attachment surfaces between the upper panel 200 and the upper support substrate 20. Subsequently, when the cutting unit 50 is inserted to the gap G2, areas around the corners of the upper panel 200 and the upper support substrate 20 start to be separated, and when entrance of the cutting unit 50 progresses, an initial peeling is performed as if the cutting unit 50 lifts the upper panel 200.

When the initial peeling is first performed at any one corner of the laminate, the upper support substrate 20 may be separated by using a vacuum/adsorption jig. The initial peeling and the separation through the tapered corner 21 may minimize a scratch on the lower and upper support substrates 10 and 20, as well as the lower and upper panels 100 and 200, and thus the lower and upper support substrates 10 and 20 may be re-used several times.

When the cutting unit 50 is inserted to the gap G2, the blade of the cutting unit 50 may be pushed to be in contact with the upper panel 200 by a predetermined angle. In this case, the blade of the cutting unit 50 enters a bonded surface between the upper panel 200 and the upper support substrate 20 along the surface of the upper panel 200, so that a body of the cutting unit 50 may easily lift the upper support substrate 20. When the angle is excessively large or excessively small, the body of the cutting unit 50 may not easily lift the upper support substrate 20, and may damage a surface of the panel 200. Accordingly, the blade of the cutting unit 50 may enter while having an angle of approximately 7° to approximately 15° with the upper panel 200, but the angle may be changed according to the angle of the cutting unit blade and a thickness of the body of the cutting unit.

The lower support substrate 10 may be separated in the same manner as the same method of separating the upper support substrate 20 by turning the left laminate over, i.e., rotate by 180° with respect to a horizontal axis, after separating the upper support substrate 20 as described above. Depending on a case, the lower support substrate 10 may also be separated by moving the cutting unit 50 and a separation means, such as the vacuum/adsorption jig, toward the lower support substrate 10 without turning the laminate, from which the upper support substrate 20 is separated, over.

The tapered corners 11a and 21a enabling the lower and upper support substrates 10 and 20 to be easily initially peeled off as described above may be provided at one corner of four corners of the lower and upper support substrates 10 and 20, respectively. Optionally, the tapered corner may be provided at a plurality of corners, and in this case, it is possible to decrease a separation time of the lower and upper support substrates 10 and 20 by performing the initial peeling at a plurality of points.

Optionally or additionally, the tapered portions of the upper support substrate 20 and the lower support substrate 10 may also be provided at a border including the corner or excluding the corner. However, when any one portion of the lower and upper support substrates 10 and 20 are initially peeled, it is possible to separate the lower and upper support substrates by using the vacuum/adsorption jig thereafter, so that a portion, that is, the corner, enabling the initial peeling to be easily performed is advantageous as the tapered portion. When the initial peeling is performed at the border, not the corner, of the support substrate, the width of the cutting unit needs to be considerably wide.

Figure 6:
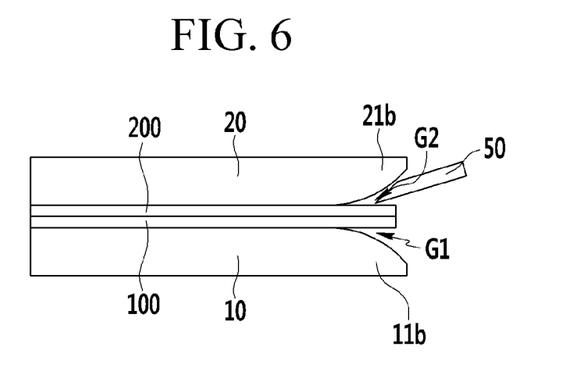
FIGS. 6 and 7 are exemplary variations of FIG. 4.
Figure 7:
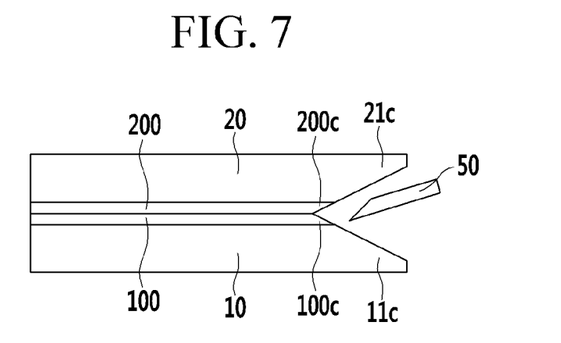

FIGS. 6 and 7 illustrate a cross-section of one corner of the laminate, similar to FIG. 4, but the tapered corners may be slightly differently provided from those of FIG. 4.

First, in the exemplary embodiment of FIG. 6, tapered corners 11b and 21b of the lower and upper support substrates 10 and 20 may be curved inclined surfaces. The tapered corners 11b and 21b are different from the tapered corners 11a and 21a having the straight inclined surfaces illustrated in FIG. 4. In a case where the inclined surfaces of the tapered corners 11b and 21b are the curved surfaces, the tapered portions may be entirely provided to be thicker, so that it is possible to decrease a possibility that the lower and upper support substrates 10 and 20 are damaged.

In FIG. 7, corners 11c and 21c of the lower and upper support substrates 10 and 20 are tapered, and corners 100c and 200c of the lower and upper panels 100 and 200 are also tapered. In the tapered corners 100c and 200c of the lower and upper panels 100 and 200, edges meet starting portions of the tapered corners 11c and 21c of the upper and lower support substrates 10 and 20, and the corners 100c and 11c, and 200c and 21c form smoothly inclined surfaces.

The aforementioned tapered corners may be provided at the lower and upper support substrates 10 and 20 and the lower and upper panels 100 and 200 by simultaneously chamfering processing the corners of the lower panel 100 and the lower support substrate 10 and then simultaneously chamfer processing the corners of the upper panel 200 and the upper support substrate 20 before dropping liquid crystal after forming the lower and upper panels 100 and 200, or before bonding the panels depending on a case. Depending on exemplary embodiments, the tapered corners may also be provided by chamfering processing the corners in a state where the lower and upper thin substrates, on which the lower and upper panels 100 and 200 are to be provided, are attached to the lower and upper support substrates 10 and 20, respectively.

Figure 8:
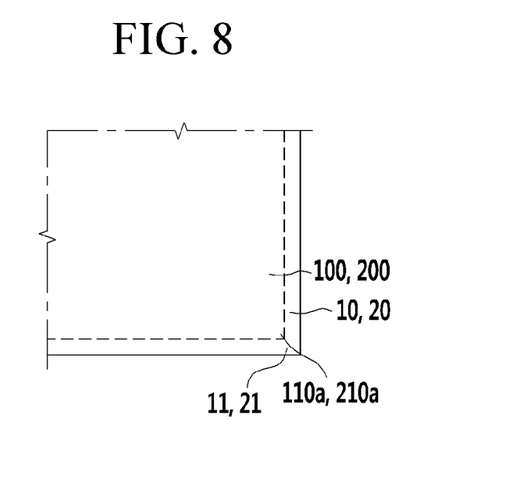
FIGS. 8 and 9 are diagrams illustrating exemplary embodiments of shapes of a corner of the panel.
Figure 9:
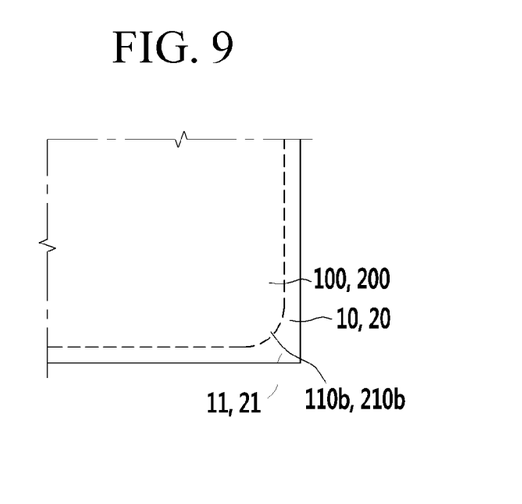

FIGS. 8 and 9 are drawings illustrating shapes of the corners of the panels.

As illustrated in FIG. 8, corners 110a and 210b of the lower and upper panels 100 and 200 may substantially have a right angle, which is an original state in which the lower and upper panels 100 and 200 are cut in a rectangular shape. In a case where the lower and upper support substrates 10 and 20 are initially peeled by inserting the cutting unit 50 to the gaps G1 and G2 defined at the tapered corners 11 and 21 of the lower and upper support substrates 10 and 20 (also refers to FIG. 5), strength of the corners 110a and 210a of the lower and upper panels 100 and 200 is low, so that a crack may be generated at the corners 110a and 210a. The crack may progress to insides of the corners 110a and 210a without being limited to the corners 110a and 210a, and further when the corners 110a and 210a of the lower and upper panels 100 and 200 are separated as pieces, processing equipment may be contaminated.

Accordingly, as illustrated in FIG. 9, the corners 110b and 210b of the lower and upper panels 100 and 200 may be rounded, and thus a possibility that the crack is generated at the corners 110b and 210b may be decreased. The rounded corners 110b and 210b may be corners corresponding to the tapered corners 11 and 21 of the support substrates. The rounded corners 110b and 210b may have a curvature radius of approximately 3 mm or lower.

The rounding of the corners 110b and 210b of the lower and upper panels 100 and 200 may be performed during a process of chamfering processing the lower panel 100 and the upper panel 200 after boding the lower panel 100 and the upper panel 200, or a process of preparing the thin substrates, which is before the attaching of the lower thin substrate and the upper thin substrate to the lower support substrate 10 and the upper support substrate 20, respectively.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of manufacturing a liquid crystal display panel, the method comprising:
preparing first and second thin substrates for an upper panel and a lower panel, respectively, and first and second support substrates which support the first and second thin substrates, respectively;
attaching the first thin substrate to the first support substrate, and attaching the second thin substrate to the second support substrate;
forming the upper panel and the lower panel by forming members for the display panel on surfaces of the respective thin substrates in a state where the first and second thin substrates are attached to the first and second support substrates, respectively;
bonding the upper panel and the lower panel; and
separating the first and second support substrates from the upper panel and the lower panel,
wherein at least one part of less than an entire border of a surface of each of the first and second support substrates which are attached to the upper or lower panel, respectively, is tapered.

2. The method of claim 1, wherein:
at least one corner among corners of the border of each of the first and second support substrates is tapered.

3. The method of claim 1, wherein:
tapered portions of the borders of the first and second support substrates are inclined at a predetermined inclination with reference to a direction in which the upper and lower panels are extended.

4. The method of claim 1, wherein:
tapered portions of the borders of the first and second support substrates are inclined with reference to a direction in which the upper and lower panels are extended and include curved surfaces.

5. The method of claim 1, wherein:
at least one portion of a border of a bonded surface of each of the upper and lower panels is tapered, and tapered portions of the first and second support substrates are extended to tapered portions of the upper and lower panels.

6. The method of claim 1, further comprising:
surface-treating at least one surface among the surfaces of the first or second thin substrate and the first and second support substrate to be attached, before the attaching the first and second support substrates to the first and second thin substrates, respectively.

7. The method of claim 6, wherein:
the surface-treating includes performing a hydrophobic treatment on the at least one surface.

8. The method of claim 1, further comprising:
forming a liquid crystal layer before or after the bonding the upper panel and the lower panel.

9. The method of claim 1, wherein:
the separating the first and second support substrates includes pushing a cutting unit between external surfaces of the first and second panels and the tapered portions of the first and second support substrates and peeling off the first and second support substrates from the upper and lower panels, respectively.

10. The method of claim 9, further comprising:
separating the first and second support substrates with a vacuum or adsorption jig after the peeling off of the first and second support substrates by the cutting unit.

11. A laminate, comprising:
an upper display panel and a lower display panel including first and second thin substrates, respectively;
members for the upper and lower display panels, respectively, are disposed on surfaces of the first and second thin substrates;
a first support substrate attached to an upper surface of the upper display panel; and
a second support substrate attached to a lower surface of the lower display panel,
wherein at least one part of less than an entire border of the upper and lower surfaces of the first and second support substrates which are attached to the upper or lower display panel, respectively, is tapered.

12. The laminate of claim 11, wherein:
at least one corner among corners of the border of each of the first and second support substrates is tapered.

13. The laminate of claim 11, wherein:
tapered portions of the borders of the first and second support substrates are inclined at a predetermined inclination with reference to a direction in which the upper and lower display panels are extended.

14. The laminate of claim 11, wherein:
tapered portions of the borders of the first and second support substrates are inclined while forming curved surfaces with reference to a direction in which the upper and lower display panels are extended.

15. The laminate of claim 11, wherein:
at least one portion of a border of a bonded surface of each of the upper and lower display panels is tapered, and the tapered portions of the first and second support substrates extend to the tapered portions of the upper and lower display panels.

16. The laminate of claim 11, wherein:
at least one corner of the first or second thin substrate is rounded.

17. The laminate of claim 16, wherein:
a rounded corner has a curvature radius equal to or less than approximately 3 millimeters.

18. The laminate of claim 11, wherein:
the first and second support substrates have the same size as or a larger size than the first and second thin substrates.

19. The laminate of claim 11, wherein:
a thickness of the first or second thin substrate is equal to or less than approximately 2 millimeters.

20. The laminate of claim 11, wherein:
a thickness of each of the first and second support substrates is approximately 4 millimeters or more, and a width of the tapered portion of the border is approximately 2 millimeters or lower.

* * * * *